US005134249A

United States Patent [19]

Adachi

[11] Patent Number: 5,134,249

[45] Date of Patent: Jul. 28, 1992

[54] ELECTRONIC CIRCUIT CONNECTORS AND METHOD OF MANUFACTURING THE SAME

[75] Inventor: Yoshio Adachi, Kodaira, Japan

[73] Assignee: AUE Institute Limited, Kodaira, Japan

[21] Appl. No.: 691,395

[22] Filed: Apr. 25, 1991

[51] Int. Cl.[5] .......................................... H02G 15/113

[52] U.S. Cl. ........................................ 174/92; 29/872; 174/84 R

[58] Field of Search ..................... 174/92, 84 R, 94 R; 29/868, 872; 228/110, 111, 174

[56] References Cited

U.S. PATENT DOCUMENTS

| | | | |
|---|---|---|---|
| 2,475,184 | 7/1949 | Hudson | 174/92 |
| 2,810,115 | 10/1957 | Abbott | 174/92 |
| 3,519,731 | 7/1970 | Grunbaum | 174/138 F |
| 3,717,842 | 2/1973 | Douglas, Jr. | 174/84 R |
| 3,822,465 | 7/1974 | Frankort et al. | 228/111 |
| 3,836,699 | 9/1974 | Downing | 174/92 X |
| 4,712,723 | 12/1987 | Moll et al. | 228/111 |
| 4,778,948 | 10/1988 | Fitch et al. | 174/88 R |

FOREIGN PATENT DOCUMENTS

| | | | |
|---|---|---|---|
| 995315 | 8/1976 | Canada | 174/92 |
| 615300 | 1/1980 | Switzerland | 174/94 R |

*Primary Examiner*—Morris H. Nimmo
*Attorney, Agent, or Firm*—Gottlieb, Rackman & Reisman

[57] ABSTRACT

A new and improved electronic circuit connector and method of producing the same is provided by forming a groove on a surface of a first section of ultrasonically weldable material, inserting an elongated contact partially within the groove whereby one end of the contact protrudes out from an end of the connector, overlaying an elongated lead wire on the contact within the groove whereby the lead wire also extends beyond the connector boundary but in an opposite direction of the protruding end of the contact, fitting a second section of ultrasonically weldable material on top of the first section whereby the second section includes a protrusion shaped to interconnect with the groove of the first section, and ultrasonically welding the first and second sections together. Engaging means may be employed on the groove and corresponding protrusion to facilitate alignment of the first and second sections of material. Other embodiments of the present invention enable fabrication of multiple lead connectors and multi-layered connectors.

16 Claims, 2 Drawing Sheets

ELECTRONIC CIRCUIT CONNECTORS AND METHOD OF MANUFACTURING THE SAME

FOREIGN PRIORITY

Priority of the present application is claimed pursuant to 35 U.S.C. §119 based on the filing on June 28, 1990 of Japanese Patent Application No. 171058, entitled "Connectors and a Method of Manufacturing Connectors" on behalf of AUE Research Laboratory of Kodaira City, Tokyo, Japan.

1. Field of the Invention

This invention pertains generally to a method of manufacturing connectors for electrical circuits and, more particularly, to a method of manufacturing connectors for electrical circuits whereby said connectors are ultrasonically welded.

2. Background of the Invention

Many applications of electrical circuits require the interconnection of various lead wires of component circuits. Prior art methods of forming such interconnections are quite labor intensive. In particular, the prior art method of joining lead wires requires the removal of insulation from the end of each lead wire. This step is both time consuming and subject to high defect rates based on the possibility of damaging the wick-like conducting wire while removing the insulation.

After the insulation is removed from each lead wire, the lead wire is then electrically connected to a conducting material by means of caulking or soldering. Next, the lead wires need to be placed into the set positions of the connectors for multiple pin use. The connector parts are then covered and screwed into place.

Alternatively, in the prior art, a contact section with an attached lead wire could be joined to a connector part by aligning the parts on a molding stand and molding the parts together. Again, removal of the insulation at the end of each lead wire is required. Additionally, even after the contact part is molded to the connector part, the lead wire must still be joined to the terminal by either caulking or soldering.

Another commonly encountered problem in the prior art was that, in order to prevent gutters when attaching the contact and lead wire joints to the connector section, fixing with shrink tubing had to be used. Installing shrink tubing was also necessary in order to impart tensile strength and to prevent lead wires from contacting other lead wires. These additional steps resulted in increased errors.

In another prior art method of manufacturing connectors for electrical circuits, the insulated lead wires were replaced with a thin film. A soldering step was still required to join the contact section and the film type lead wire.

OBJECTS AND SUMMARY OF THE INVENTION

It is therefore a general object of the present invention to provide a new and improved electronic circuit connector and method of manufacturing the same which is characterized by decreased labor costs, decreased manufacturing time, lower defect rates, and decreased complexity. A more specific object of the present invention is to provide a new and improved electronic circuit connector and method of manufacturing the same which eliminates the need for scraping off the insulation at the ends of the lead wires.

A further and yet more specific object of the present invention is to provide a new and improved electronic circuit connector and method of manufacturing the same wherein the lead wire can be fixed to the connector section without the need of a soldering or caulking step.

These and other objects and advantages of the present invention are achieved in a first embodiment by forming a groove on a surface of a first section of ultrasonically weldable material, inserting an elongated contact partially within the groove whereby one end of the contact protrudes out of an end of the connector, overlaying an elongated lead wire on the contact within the groove whereby the lead wire also extends beyond the connector boundary but in a direction opposite the protruding end of the contact, fitting a second section of ultrasonically weldable material on top of the first section whereby the second section includes a protrusion shaped to interconnect within the groove of the first section, and ultrasonically welding the first and second sections together.

A second embodiment of the present invention implements the basic concept of the first embodiment, except it incorporates a plurality of grooves, associated contacts, associated lead wires, and interconnecting protrusions to enable the fabrication of multiple lead connectors.

A third embodiment of the present invention again utilizes similar concepts of the first two embodiments except that several layers of lead wires are created by stacking contacts and lead wires on layers of existing grooves.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENTS

Figure 1:
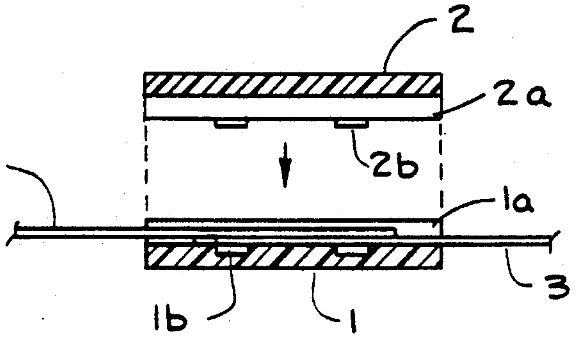
FIG. 1 is an exploded cross sectional view of a connector embodying the present invention.
Figure 2:
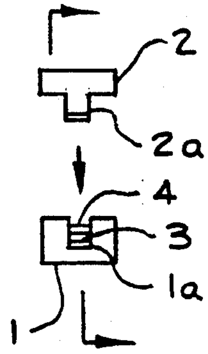
FIG. 2 is a front elevation view of the connector of FIG. 1.

Referring specifically to FIG. 1, a first ultrasonically weldable section 1 and a second ultrasonically weldable section 2 are shown. Examples of materials weldable under ultrasonic frequency are well known in the art, and include materials such as polystyrene, polyethylene and polyamide resin as examples. Section 1 has a groove la cut along the length of the top surface of section 1. As seen in FIG. 2, groove 1*a* is rectangularly cut to a partial depth of section 1. It should be noted that many variations in the size and shape of groove la can be implemented and the shape shown in FIG. 2 is illustrative of the many possible variations. For instance, a groove that tapers inward as its depth within section 1 increases is advantageous when ease of fit of a compatible interlocking component is deemed important.

Section 1 also has etched within groove 1*a* a series of small holes 1*b*. Holes 1*b* help insure proper alignment of section 1 and section 2 when they are ultrasonically welded together.

Section 2 contains a protruding section 2*a* which is formed to fit the aforementioned grooved section la. Additionally, section 2 comprises a series of fittings 2*b* compatible with holes 1*b* of section 1.

An elongated contact 3 is set within groove 1*a* so that one end of contact 3 extends beyond the boundary of section 1. Typically, groove 1*a* is etched to a level to contain contact section 3 without any gap. As will be apparent to those skilled in the art, contact 3 will typically be a thin metallic plate or a thin round metal pin.

A lead wire 4 is then placed within groove 1*a*, overlaying contact 3, such that one end of lead wire 4 extends beyond the exterior of section 1 in the opposite direction of contact 3. Lead wire 4 can comprise a vinyl insulated thin twisted wire, a single wire, or a thin film type of lead wire and is typically formed from a conductor such as copper. However, various other appropriate conductors may also be utilized.

Figure 3:
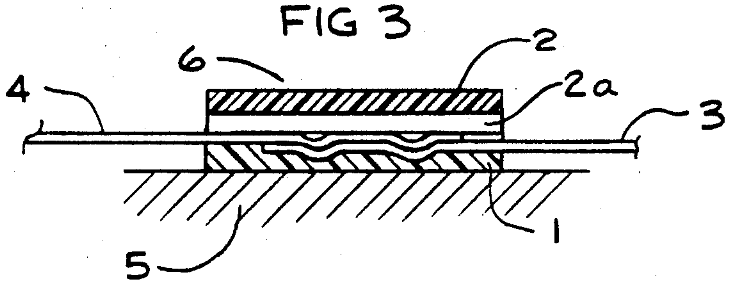
FIG. 3 is a cross sectional view of the connector shown in FIG. 1 which has been ultrasonically welded.

Each of the above-mentioned components are joined by placing section 1 on a stand 5 as shown in FIG. 3. Then, contact 3 is inserted into groove 1*a*, extending a fixed length out from one end of section 1. Next, without any need for peeling its vinyl insulation, lead wire 4 is inserted into groove 1*a* of section 1 on the opposite side of the protruding end of contact 3, and laid on top of contact 3 at a position sufficient to cover small hole 1*b*. Finally, section 2 is fitted to cover section 1. Section 1 and section 2 are now prepared to undergo ultrasonic welding. If necessary, section 1 and section 2 can be clamped together under pressure by the electrodes of an ultrasonic welding device (not shown). When an ultrasonic frequency is applied, the vinyl insulation of lead wire 4 dissolves, and lead wire 4 is welded to contact 3 in an electrically coupled manner. At the same time, section 1 and section 2 are also welded together resulting in a connector generally labeled 6 with attached lead wire 4. The ultrasonic frequencies to be applied will vary based on factors such as the material used for sections 1 and 2. However, frequencies between 25–30 MHz have proven to be very effective.

Figure 4:
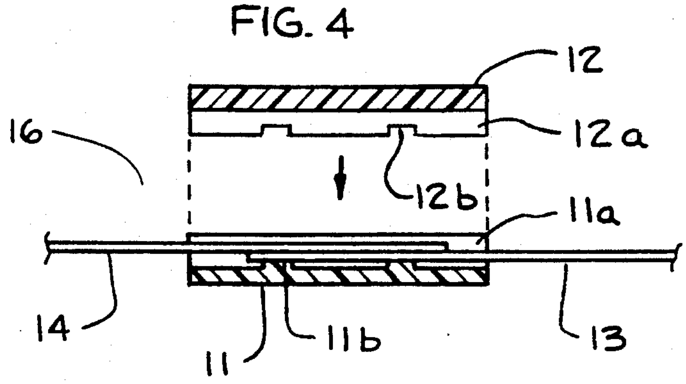
FIG. 4 is an exploded cross sectional view of another alternate embodiment of a connector for an electrical circuit embodying the present invention.

FIG. 4 is a representative embodiment wherein small protrusions 11*b* are set on the upper surface of groove 11*a*. Corresponding small holes 12*b* at the top of protrusion 12*a* are also formed. A contact 13 is placed within groove 11*a* overlaying protrusions 11*b*. Lead wire 14 is placed within groove 11*a* over contact 13 to obtain a connector 16 with attached lead wire 14.

Figure 5:
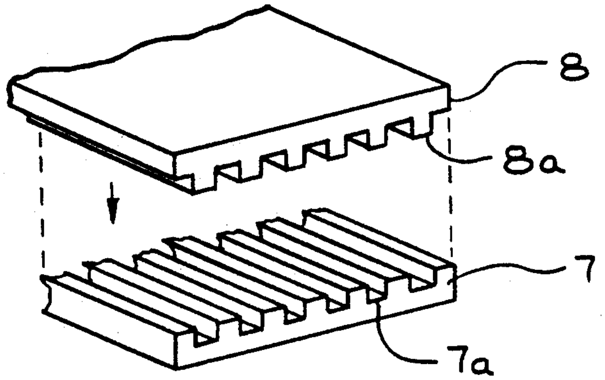
FIG. 5 is an exploded perspective view of another embodiment of the present invention capable of having multiple pin connections.

FIG. 5 illustrates an embodiment of the present invention whereby multiple lead pins can be created. An array of multiple grooves 7*a* is formed on material 7. Material 7 is weldable under ultrasonic frequency. A second ultrasonically weldable section 8 contains multiple protrusions 8*a*, wherein the number of protrusions 8*a* is equal to the number of grooves 7*a* on section 7. Protrusions 8*a* allow section 8 to properly couple with section 7 by engaging grooves 7*a*. Although not shown, again small holes or small protrusions can be placed on protrusions 8*a* to couple with opposite corresponding small protrusions or small holes within grooves 7*a*. Contacts and lead wires are applied in each groove of grooves 7*a* in a manner similar to that described in reference to FIGS. 1–4 above. Section 8 is then placed on section 7 and ultrasonic welding is applied. The result is a connector having a multiplicity of pins.

It will be apparent to those skilled in the art that grooves 7*a* and protrusions 8*a* can utilize various shapes as long as the opposite protrusions and grooves permit efficient coupling.

Figure 6:
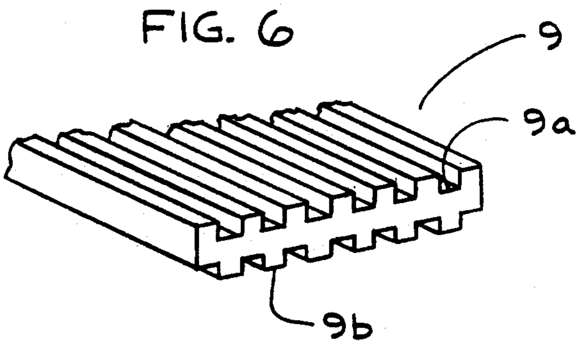
FIG. 6 is a perspective view of another embodiment of the present invention having multiple connectors on separate levels.

Referring specifically to FIG. 6, a section of ultrasonically weldable material 9 useful in multi-level, multi-connector applications of the present invention is shown. Groove shape 9*a* is formed to engage protrusion 8*a* of section 8 described previously and illustrated in FIG. 5. Moreover, at the underside of section 9, protrusion 9*b* is set to engage groove 7*a* previously described and illustrated in FIG. 5. When pre-selected numbers of contacts and pins are placed within grooves 9*a* and grooves 7*a*, a multi-level connector with multiple pins is created. Moreover, more complex applications might require additional levels of pins which can be achieved by stacking several levels of sections similar to section 9.

While several embodiments of the present invention have been shown and described in conjunction with the figures above, further modifications and improvements will occur to those skilled in the art. For example, the small holes and the small protrusions described in conjunction with the preferred embodiment allow for more effective coupling of the opposing sections. However, the present invention can be practiced without these optional features. Moreover, although the reliability of proper connections will deteriorate, it is possible to ultrasonically weld contacts and leads together between two ultrasonically weldable sections without the need for compatable grooves and protrusions on the two sections.

While the examples above refer to a vinyl insulated lead wire, it is of course possible to manufacture the contact section by stripping the vinyl insulation and applying ultrasonic vibration to the exposed wire. Although maintaining the additional step of stripping the vinyl insulation is unnecessary and will result in a higher percentage of defects, it does illustrate that the present invention can be practiced with pre-stripped wires. Additionally, while the present invention has been described with respect to the joining of electrical connectors, it also has applications to cartridge cases, terminals, tone arms and the like.

I desire it to be understood, therefore, that this invention is not limited to the particular forms shown and I intend to cover all modifications which do not depart from the spirit and scope of the invention.

What is claimed is:

1. A method of manufacturing connectors comprising the steps of:

forming a groove extending along the length of a first section of ultrasonically weldable material;

inserting an elongated contact partially within said groove whereby said elongated contact has a protruding end extending beyond said first section;

overlaying an elongated lead wire on said contact within said groove, said lead wire extending beyond said first section at the end opposite said protruding end of said contact;

fitting a second section of ultrasonically weldable material on said first section of ultrasonically weldable material, said fitting step being facilitated by a protrusion on said second section shaped to fit within said groove; and applying an ultrasonic frequency to electrically couple said lead wire and said contact, and weld said first and second sections together.

2. The method of claim 1 wherein said step of applying an ultrasonic frequency occurs at a frequency of 25-30 megahertz.

3. The method of claim 1 additionally comprising the step of:

providing mating engaging means on said protrusion and said groove to ensure aligned coupling of said first and second sections.

4. The method of claim 3 wherein said step of providing mating engaging means comprises:

providing at least one corresponding pair of a hole and a compatible fitting, said hole and said fitting being on opposite mating surfaces of said protrusion and said groove.

5. The method of claim 1 additionally comprising the step of:

clamping said first and second sections together before commencing said step of applying an ultrasonic frequency.

6. A method of manufacturing connectors for electrical circuits comprising the steps of:

forming a first plurality of grooves extending along the length of a surface of a first section of ultrasonically weldable material;

inserting a separate one of a first plurality of elongated contacts partially within each of a predetermined number of said first plurality of grooves, each of said first plurality of elongated contacts having a protruding end extending beyond said first section;

overlaying a separate one of a first plurality of elongated leads on each of said first plurality of elongated contacts, each of said first plurality of elongated leads extending beyond said first section at the end opposite said protruding ends of said first plurality of elongated contacts;

fitting a second section of ultrasonically weldable material on said first section of ultrasonically weldable material said fitting step being facilitated by a first plurality of protrusions on said second section shaped to fit within first said plurality of grooves; and applying an ultrasonic frequency to weld said first and second sections.

7. The method of claim 6 additionally comprising the steps of:

forming a second plurality of protrusions along a second surface of said first section of ultrasonically weldable material;

forming a second plurality of grooves extending along the length of a connecting surface of a third section of ultrasonically weldable material;

inserting a separate one of a second plurality of elongated contacts partially within each of a predetermined number of said second plurality of grooves, each of said second plurality of elongated contacts having a protruding end extending beyond second section;

overlaying a separate one of a second plurality of elongated leads on each of said second plurality of elongated contacts, each of said second plurality of elongated leads extending beyond said third section opposite said protruding ends of said second plurality of elongated contacts; and fitting said first section of ultrasonically weldable material and said third section of ultrasonically weldable material together whereby said second plurality of protrusions and said second plurality of grooves are interconnected and said first and third sections are welded together by said step of applying an ultrasonic frequency.

8. The method of claim 6 wherein said step of applying an ultrasonic frequency occurs at a frequency of 25-30 megahertz.

9. The method of claim 7 additionally comprising the steps of:

providing first engaging means on said first plurality of grooves and said first plurality of protrusions to ensure aligned coupling of said first and second sections; and providing second engaging means on said second plurality of grooves and said second plurality of protrusions to ensure aligned coupling of said first and third sections.

10. The method of claim 9 wherein said step of providing first engaging means comprises:

providing at least one first corresponding pair of a hole and a compatible fitting, said hole and said fitting on opposite marrying surfaces of said first plurality of grooves and said second plurality of protrusions; and said step of providing second engaging means comprises:

providing at least one second corresponding pair of a hole and a compatible fitting on opposite marrying surfaces of said second plurality of grooves and said second plurality of protrusions.

11. The method of claim 7 additionally comprising the step of:

clamping said first, second and third sections of ultrasonically weldable material together before commencing said step of applying an ultrasonic frequency.

12. An electrical connector comprising:

a first section of ultrasonically weldable material having a grooved region on one of its surfaces;

a second section of ultrasonically weldable material welded to said first section, said second section having a protrusion on a surface of said second section for fitting within said grooved region;

an elongated contact placed within and protruding from a first side of said grooved region; and an elongated lead wire placed within and protruding from a second side of said grooved region, said lead wire partially overlaying and electrically coupled to said elongated contact between said first and second sections.

13. The electrical connector of claim 12 wherein said lead wire is vinyl insulated.

14. The electrical connector of claim 12 wherein said lead wire is a thin film lead wire.

15. The electrical connector of claim 12 additionally comprising mating engaging means on said protrusion and said grooved region to ensure aligned coupling of said first and second sections.

16. An electrical connector comprising:

a first section of ultrasonically weldable material al having a plurality of grooved regions on its surface;

a second section of ultrasonically weldable material welded to said first section, said second section having a corresponding plurality of protrusions for fitting within said grooved regions; and a separate one of a plurality of elongated contacts placed within and protruding from a first side of each of said plurality of grooved regions, a plurality of elongated lead wires paced within and protruding from a second side of said plurality of grooved regions, each of said plurality of lead wires overlaying and electrically coupled to a separate one of said plurality of elongated contacts between said first and second sections.

* * * * *